United States Patent
Nakai et al.

(10) Patent No.: US 9,397,493 B2
(45) Date of Patent: Jul. 19, 2016

(54) SWITCHING DEVICE

(71) Applicant: Sanyo Electric Co., Ltd., Moriguchi, Osaka (JP)

(72) Inventors: Tomomichi Nakai, Moriguchi (JP); Takeshi Nakashima, Moriguchi (JP); Kazuo Ishimoto, Moriguchi (JP); Hiroshi Saeki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 434 days.

(21) Appl. No.: 13/951,932

(22) Filed: Jul. 26, 2013

(65) Prior Publication Data

US 2013/0314829 A1    Nov. 28, 2013

Related U.S. Application Data

(63) Continuation of application No. PCT/JP2012/067784, filed on Jul. 12, 2012.

(30) Foreign Application Priority Data

Jul. 21, 2011   (JP) .................... 2011-159986

(51) Int. Cl.
*H02H 3/00* (2006.01)
*H02H 3/20* (2006.01)
(Continued)

(52) U.S. Cl.
CPC . *H02H 3/20* (2013.01); *H02H 7/18* (2013.01); *H02J 7/0086* (2013.01); *H02H 1/04* (2013.01);
(Continued)

(58) Field of Classification Search
USPC ............................. 361/86–87, 91.1
See application file for complete search history.

(56) References Cited

U.S. PATENT DOCUMENTS

| | | | | |
|---|---|---|---|---|
| 3,594,612 A | * | 7/1971 | Gately | H02H 9/041 327/310 |
| 6,028,755 A | * | 2/2000 | Saeki | H02H 7/1213 323/285 |
| 2003/0025480 A1 | * | 2/2003 | Pannwitz | H02J 7/0031 320/134 |

FOREIGN PATENT DOCUMENTS

| JP | S52114933 A | 9/1977 |
|---|---|---|
| JP | 09233713 A | 9/1997 |

(Continued)

OTHER PUBLICATIONS

International Search Report for International Application No. PCT/JP2012/067784; Date of Mailing: Oct. 16, 2012; 5 pgs. with English Translation.

*Primary Examiner* — Danny Nguyen
(74) *Attorney, Agent, or Firm* — Cantor Colburn LLP

(57) ABSTRACT

In the present invention, a main switch circuit (13) is provided between an electric power line (PL), to which voltage outputted from a solar cell (11) is applied, and a battery module (12). A protection circuit (19) turns OFF the main switch circuit (13) to protect the battery module (12) from overcharging when the voltage (VBAT) of the battery module (12) is equal to or greater than an upper limit voltage. The voltage outputted from the solar cell (11) is set so as to be greater than the upper limit voltage to allow the battery module (12) to be charged to the upper limit voltage. When a charge ON command signal has been received, a control unit (18) turns ON only a sub-switch circuit (14) to introduce current from the solar cell (11) into a parallel circuit (15) and to suppress the voltage (VPL) of the power line (PL) to less than the upper limit voltage before turning ON the main switch circuit (13).

8 Claims, 5 Drawing Sheets

(51) Int. Cl.
*H02H 7/18* (2006.01)
*H02J 7/00* (2006.01)
*H02H 9/04* (2006.01)
*H02H 1/04* (2006.01)

(52) U.S. Cl.
CPC ............... *H02H 9/041* (2013.01); *H02H 9/042* (2013.01); *H02H 9/046* (2013.01); *H02J 2007/0037* (2013.01); *Y02B 10/14* (2013.01)

(56) References Cited

FOREIGN PATENT DOCUMENTS

| | | |
|---|---|---|
| JP | H10322916 A | 12/1998 |
| JP | H10327533 A | 12/1998 |
| JP | 2006149177 A | 6/2006 |
| JP | 2008104328 A | 5/2008 |

* cited by examiner

SWITCHING DEVICE

CROSS-REFERENCE TO RELATED APPLICATIONS

This is a continuation of International Application PCT/JP2012/067784, with an international filing date of Jul. 12, 2012, filed by applicant, the disclosure of which is hereby incorporated by reference in its entirety.

FIELD OF THE INVENTION

The present invention relates to a switching device for electrical switching.

BACKGROUND

FIG. 5 is a configurational diagram of a storage system of the prior art which is able to charge a battery module 912 containing secondary batteries using power outputted from a solar cell 911. A switch circuit 913 is provided between the solar cell 911 and the battery module 912. A controller 914 turns the switch circuit 913 ON or OFF, and this starts or stops the charging of the battery module 912 with power outputted from the solar cell 911. The power stored in the battery module 912 may be discharged to a load not shown in FIG. 5.

In this type of system, a protection circuit 915 is often provided to protect the battery module 912 against overcharging (see, for example, Patent Document 1 below). The protection circuit 915 outputs a force OFF signal when the voltage V1 outputted to the battery module 912 (voltage applied to the battery module 912) rises above a predetermined first reference voltage (upper limit voltage) VH. When a force OFF signal is outputted from the protection circuit 915, the switch circuit 913 is always turned OFF regardless of the signals being outputted from the controller 914 to the switch circuit 913. Once a force OFF signal has been outputted, the protection circuit 915 keeps outputting the force OFF signal to reduce the output voltage V1 to below a second reference voltage VL that is lower than the first reference voltage VH, and stops outputting the force OFF signal when the output voltage V1 falls below the second reference voltage VL. When there is a single reference voltage (threshold voltage), the output voltage V1 is near the threshold voltage, and the output voltage V1 moves back and forth (in minor fluctuations) around the threshold voltage due to noise, the output of the force OFF signal also fluctuates (between outputting the force OFF signal and not outputting the force OFF signal). In order to stop this, a first reference value VH and a second reference value VL are established, and a hysteresis characteristic is provided to the start and stop of the force OFF signal output from the protection circuit 915. The voltage range between the first reference value VH and the second reference value VL is called the dead zone.

When output of the force OFF signal has been stopped and a charge ON command signal has been outputted from the controller 914, the switch circuit 913 is switched from OFF to ON. This raises the voltage outputted from the solar cell 911 above the first reference voltage VH so that the battery module 912 can be charged to the first reference voltage VH.

The following is an explanation of the charging operation performed in the storage system of FIG. 5 with reference to FIG. 6. Here, it is assumed that output voltage V1 is lower than the second reference voltage VL when the switch circuit 913 is turned OFF prior to timing t1. According to this assumption, when the switch circuit 913 is turned from OFF to ON by the controller 914 supplying a charge ON command signal to the switch circuit 913 at timing t1, the voltage V1 rises sharply until voltage V1 is at a level near the output voltage of the solar cell 911. As a result, the voltage V1 temporarily exceeds the first reference voltage VH. This causes the protection circuit 915 to forcibly turn off the switch circuit 913 at timing t2.

After being forcibly turned OFF, the voltage V1 tries to fall to voltage level prior to timing t1, that is, to a voltage level lower than the second reference voltage VL. The protection circuit 915 releases the forced OFF state after timing t2 at timing t3, and the switch circuit 913 is again switched ON and OFF. Because the voltage outputted by the solar cell 911 at timing t3 is lower than the voltage at timing t1 due to the current outputted from the solar cell 911 immediately after timing t1, the voltage V1 does not exceed the first reference voltage VH after timing t3, and the transitional voltage fluctuations converge at a level below the second reference voltage VL. As a result, the switch circuit 913 remains ON after timing t3, and the desired charging can be performed.

CITED DOCUMENTS

Patent Documents

Patent Document 1: Laid-Open Patent Publication No. 9-233713

SUMMARY

Problem Solved by the Invention

However, there is a case in which the desired charging does not occur. This case is explained with reference to FIG. 7 and FIG. 8. In this case, the output voltage V1 is in the dead zone when the protective function of the protection circuit 915 is turned OFF prior to timing t1' (the output voltage V1 is relatively close to the full charge voltage). The force OFF signal is not outputted when the protective function is turned OFF, and the force OFF signal is outputted when the protective function is turned ON. FIG. 8 is a state transition diagram related to the protective function of the protection circuit 915. Point 931 in FIG. 8 corresponds to the state prior to timing t1'. The protective function is turned OFF prior to timing t1', and the switch circuit 913 is turned OFF prior to timing t1' in accordance with instructions from the controller 914.

Under these assumptions, when the controller 914 switches the switch circuit 913 from OFF to ON by supplying a charge ON command signal to the switch circuit 913 at timing t1', the voltage V1 temporarily rises sharply to a voltage level near the output voltage of the solar cell 911. As a result, the voltage V1 temporarily exceeds the first reference voltage VH. As a result, the switch circuit 913 is forcibly shut down by the protection circuit 915 at timing t2'. After being forcibly shut down, the voltage V1 tries to fall to the voltage level prior to timing t1', but this level is in the dead zone so the protection circuit 915 does not release the forced shut down. This is because the state of the protection circuit 915 has transitioned from the state corresponding to point 931 in FIG. 8 to the state corresponding to point 932. As a result, charging is prohibited by the preventive function of the protection circuit 915 in the case shown in FIG. 7 whether or not the battery module 912 can be safely charged.

The voltage fluctuations after timing t1' are transitional due to the switching performed to start charging, and there is a slight chance that the battery module 912 will become degraded or damaged, but operation of the protection circuit 915 should be avoided in the situation corresponding to FIG. 7.

The purpose of the present invention is to provide a switching device able to suppress unnecessary protection operations based on transitional voltage fluctuations.

Means of Solving the Problem

The present invention is a switching device including an electric power line for receiving direct current voltage outputted from an electric power supply, a main switch circuit interposed in series between the electric power line and a power receiving unit, a control unit for turning ON or OFF the main switch circuit, a protection unit for forcibly turning OFF the main switch circuit when the voltage inputted to the power receiving unit exceeds a predetermined upper limit voltage, and a suppressor circuit connected to the electric power line. In this switching device, the control unit suppresses the voltage inputted to the electric power line to less than the upper limit voltage using the suppressor circuit prior to switching the main switch circuit from OFF to ON.

Effect of the Invention

The present invention can provide a switching device able to suppress unnecessary protection operations based on transitional voltage fluctuations.

DETAILED DESCRIPTION

The following is a detailed explanation of examples of embodiments of the present invention. In each referenced drawing, identical components are denoted by the same reference symbols. As a general rule, redundant explanation of the same components has been eliminated. For the sake of simplicity, signs or symbols may be used with reference to information, physical quantities, states or members, and the names of the information, physical quantities, states or members referred to by the signs or symbols may be abbreviated or eliminated altogether.

Figure 1:
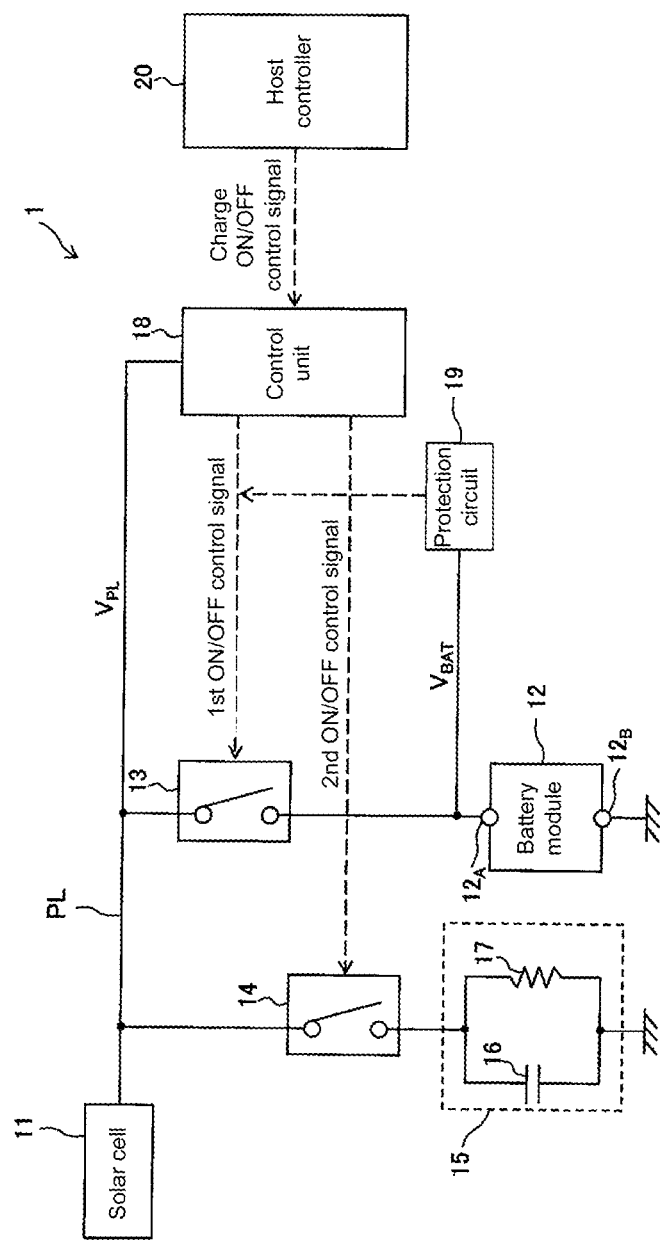
FIG. 1 is a partial configuration diagram of a charging system according to the present invention.

FIG. 1 is a partial configuration diagram of a charging system 1 according to the present invention. The configuration of the charging portion between the solar cell and the secondary batteries in the charging system 1 is shown in FIG. 1. The charging system can be substituted with a solar cell system. The charging system 1 may include all of the components shown in FIG. 1 (the components referenced by 11~20 and PL), or the charging system 1 may include some of the components shown in FIG. 1.

The solar cell 11 generates electric power based on sunlight, and outputs direct current power obtained in this way. The power line PL is used to propagate the direct current power outputted from the solar cell 11, and receives the direct current power voltage of the solar cell 11 based on power generated by the solar cell 11 (in other words the direct current voltage outputted from the solar cell 11 is applied to the power line PL). In the present specification, unless otherwise indicated, the voltage is the voltage as viewed from a reference potential point having the reference potential. The voltage applied to the power line PL is represented by the symbol VPL.

This battery module 12 has one or more secondary batteries. The secondary batteries forming the battery module 12 can be any type of secondary battery, such as lithium ion batteries and nickel-hydrogen batteries. Some or all of the secondary batteries in the battery module 12 may be secondary batteries connected in series or in parallel. The voltage generated between the negative terminal 12B and the positive terminal 12A of the battery module 12, that is, the voltage outputted from the battery module 12, is represented by the symbol VBAT. Here, the battery module 12 is a plurality of secondary batteries connected in series. The negative electrode of the secondary battery located on the lower potential side is connected to the negative terminal 12B, and the positive electrode of the secondary battery located on the higher potential side is connected to the positive terminal 12A. The negative electrode 12B is connected to the reference potential point.

Both the main switch circuit 13 and the sub-switch circuit 14 can by any type of semiconductor switching element or mechanical lever. The semiconductor switching element can be formed using a metal-oxide semiconductor field-effect transistor (MOSFET) or an insulated gate bipolar transistor (IGBT). Both switch circuits 13, 14 have first and second conduction terminals (also referred to below as the control terminals). The first conduction terminals of the switch circuits 13, 14 are connected to the power line PL. The second conduction terminal of the main switch circuit 13 is connected to the positive terminal 12A of the battery module 12. The second conduction terminal of the sub-switch circuit 14 is connected to a parallel circuit 15 having of a capacitor 16 and resistor 17 connected in parallel, and is connected via the parallel circuit 15 to the reference potential point. (More specifically, the second conduction terminal of the sub-switch circuit 14 is connected to the reference potential point via the capacitor 16 and also connected to the reference potential point via the resistor 17.) Thus, the main switch circuit 13 is interposed in series between the power line PL and the battery module 12, and the sub-switch circuit 14 is interposed in series between the power line PL and the parallel circuit 15.

The control unit 18 is formed using a microcomputer or logic circuit and, on the basis of charge ON command signals or charge OFF command signals supplied from a host controller 20, outputs to the main switch circuit 13 a first ON control signal to turn ON the main switch circuit 13 or a first OFF control signal to turn OFF the main switch circuit 13, and outputs to the sub-switch circuit 14 a second ON control signal to turn ON the sub-switch circuit 14 or a second OFF control signal to turn OFF the sub-switch circuit 14. The first ON control signal and first OFF control signal are inputted to the control terminal of the main switch circuit 13, and the second ON control signal and the second OFF control signal are inputted to the control terminal of the sub-switch circuit 14. However, an action of the protection circuit 19 may keep the first ON control signal from being inputted to the control terminal of the main switch circuit 13. (This will be explained in greater detail below.)

When the main switch circuit 13 is turned ON, the first and second conduction terminals of the main switch circuit 13 are in a conductive state. As a result, the power line PL and the positive terminal 12A are connected, and voltage VPL is applied to the battery module 12 (that is, voltage VPL is applied between the negative terminal 12B and the positive terminal 12A). Therefore, when the main switch circuit 13 is turned ON, the current outputted from the solar cell 11 can be used to charge the battery module 12. When the main switch circuit 13 is turned OFF, the first and second conduction terminals of the main switch circuit 13 are disconnected. As a result, the power line PL and the positive terminal 12A are disconnected (blocked). In the present embodiment, the voltage drop in the main switch circuit 13 that occurs when the main switch circuit 13 is turned ON has been ignored for the sake of simplicity. (The same is true of the sub-switch circuit 14.)

When the sub-switch circuit 14 is turned ON, the first and second conduction terminals of the sub-switch circuit 14 are in a conductive state. As a result, the power line PL and the parallel circuit 15 are connected, and voltage VPL is applied to the parallel circuit 15. When the sub-switch circuit 14 is turned OFF, the first and second conduction terminals of the sub-switch circuit 14 are disconnected. As a result, the power line PL and the parallel circuit 15 are disconnected (blocked).

When the host controller 20 wants the battery module 12 to be charged using power outputted by the solar cell 11, a charge ON command signal is outputted to the control unit 18. When it wants to suspend or stop charging the battery module 12 using power outputted by the solar cell 11, a charge OFF command signal is outputted to the control unit 18. The host controller 20 can output a charge ON command signal or charge OFF command signal to the control unit 18 on the basis of the output voltage VBAT of the battery module 12. While not shown in FIG. 1, output power from the solar cell 11 or power discharged from the battery module 12 can be supplied to a load.

The protection circuit (protection unit) 19 detects and monitors the output voltage VBAT of the battery module 12. The output voltage VBAT may be detected by the battery module 12. The protection circuit 19 outputs a force OFF signal when the output voltage VBAT is greater than a predetermined first reference voltage (upper limit voltage) VREFH in order to protect the battery module 12 from overcharging. When a force OFF signal is outputted from the protection circuit 19, the main switch circuit 13 is always turned OFF regardless of the signals being outputted from the control unit 18 to the main switch circuit 13. Therefore, the protection circuit 19 could be said to have a function which disconnects the power line PL from the battery module 12 by forcibly turning OFF the main switch circuit 13 when the output voltage VBAT of the battery module 12 is greater than the first reference voltage VREFH. Focusing on charging the battery module 12, the output voltage VBAT of the battery module 12 could be said to be the input voltage from the power line PL to the battery module 12.

Once a force OFF signal has been outputted, the protection circuit 19 keeps outputting the force OFF signal to reduce the output voltage VBAT to below a second reference voltage VREFL. Output of the force OFF signal is stopped when the output voltage VBAT has fallen below the second reference voltage VREFL. When a first ON control signal is outputted from the control unit 18 at the same time output of the force OFF signal is stopped, the first ON control signal is inputted to the control terminal of the main switch circuit 13, and the main switch circuit 13 is turned ON. When the output voltage VBAT is below the second reference voltage VREFL, and a first ON control signal has been outputted from the control unit 18, the protection circuit 19 may output a force ON signal to forcibly turn ON the main switch circuit 13.

In the storage system 1, inequality equation "0<VREFL<VREFH" is satisfied to provide hysteresis characteristics to the start and stop of the force OFF signal output from the protection circuit 19. The first reference voltage VREFH can be established based on the full charge voltage of the battery module 12. The voltage range that is greater than the second reference voltage VREFL but less than the first reference voltage VREFH is called the dead zone (see FIG. 3 described below). The output signal status of the protection circuit 19 does not change despite any change in the voltage VBAT as long as the voltage VBAT is in the dead zone.

Figure 2:
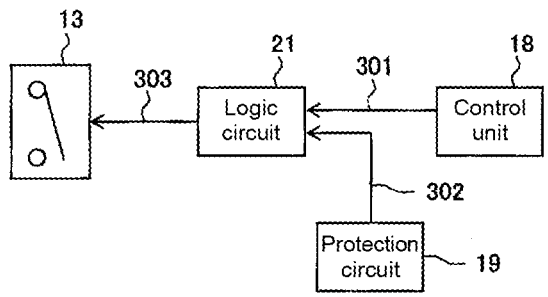
FIG. 2 is a block diagram of a portion of the charging system in FIG. 1.

For example, the logic circuit 21 shown in FIG. 2 can be provided in the storage system 1 of FIG. 1. This logic circuit 21 can be considered to be a configurational element of the protection circuit 19. The logic circuit 21 is provided in the wire used to propagate control signals 301 from the control unit 18 to the main switch circuit 13, and may receive control signals 301 and output signals 302 from the protection circuit 19 as input signals. The control signal 301 is a first ON control signal or first OFF control signal. When a force OFF signal is not being outputted from the protection circuit 19 (that is, when the output signal 302 is not a force OFF signal), the logic circuit 21 supplies the first ON control signal outputted from the control unit 18 to the control terminal of the main switch circuit 13 as the output signal 303 from the logic circuit 21. When a force OFF signal is being outputted from the protection circuit 19 (that is, when the output signal 302 is a force OFF signal), the logic circuit 21 supplies a signal for turning OFF the main switch circuit 13 to the control terminal of the main switch circuit 13 as the output signal 303 of the logic circuit 21. When the control signal 301 is a first OFF control signal, the logic circuit 21 supplies the first OFF signal to the control terminal of the main switch circuit 13 as the output signal 303 of the logic circuit 21.

The following operations are typical operations performed when the control unit 18 outputs a first ON control signal. When the control unit 18 outputs a first ON control signal, the main switch circuit 13 is switched from OFF to ON. When the voltage VBAT of the battery module 12 increases to the first reference voltage VREFH due to charging, and the protection circuit 19 outputs a force OFF signal, the main switch circuit 13 is turned OFF.

Figure 3:
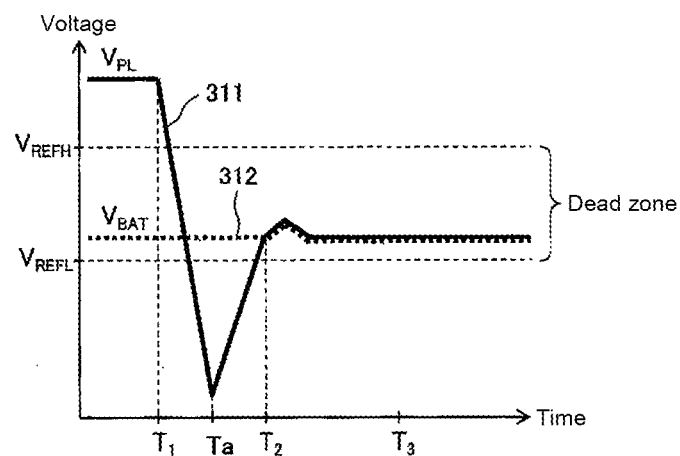
FIG. 3 is a graph showing the charging operations performed by the charging system in FIG. 1.
Figure 3:
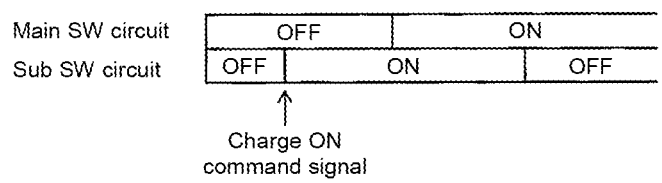

The following is a detailed explanation with reference to FIG. 3 of the operations performed at the start of charging the battery module 12 in a storage system 1 with this configuration. Here, the symbol "Ti" is introduced to represent the timing or time (i is an integer). Timing Ti+1 is subsequent to timing Ti. In FIG. 3, the solid lines indicate the signal waveform of voltage VPL and the dotted lines indicate the signal waveform of voltage VBAT. After timing T2, the solid lines 311 and dotted lines 312 overlap.

The output voltage of the solar cell 11 is usually higher than the first reference voltage VREFH, but this depends on the power generating state of the solar cell 11. Here, the output voltage of the solar cell 11 corresponds to the voltage VPL when both main switch circuit 13 and sub-switch circuit 14 are turned OFF. This allows the battery module 12 to be charged to the first reference voltage VREFH using the output voltage of the solar cell 11. When the output of the solar cell 11 is connected directly to the battery module 12, the number of secondary batteries connected in series in the battery module 12 can be established so that the battery module 12 can be safely charged to the first reference voltage VREFH, and the number of solar cells connected in series can be established accordingly after determining the output voltage of the secondary batteries.

Immediately prior to timing T1, both main switch circuit 13 and sub-switch circuit 14 are turned OFF, and the voltage VPL in the power line PL is higher than the first reference voltage VREFH. Also, immediately prior to timing T1, the inequality equation "VREFL<VBAT<VREFH" is satisfied. The voltage VBAT immediately prior to timing T1 can be lower than the second reference voltage VREFL. In addition, immediately prior to timing T1, the voltage at both poles of the capacitor 16 is assumed to be sufficiently low (for example, zero).

In the operation example shown in FIG. 3, at timing T1, the host controller 20 outputs a charge ON command signal to the control unit 18. Once received, the control unit 18 outputs a second ON command signal. (The output of the charge ON command signal may be continued after timing T1.) At this stage, the control unit 18 does not output the first ON control signal. It first outputs the first ON control signal at timing T2. In other words, between timing T1 and timing T2, the control unit 18 outputs a second ON control signal to the sub-switch circuit 14, and then outputs a first ON control signal to the main switch circuit 13. As a result, the main switch circuit 13 remains OFF between timing T1 and timing T2, and the sub-switch circuit 14 remains ON.

When the sub-switch circuit 14 is switched from OFF to ON at timing T1, the current outputted from the solar cell 11 flows to the parallel circuit 15. Because the equivalent circuit in the solar cell 11 is a series circuit with an output resistance of zero and an ideal power and internal resistance, when the current outputted from the solar cell 11 flows to the parallel circuit 15, the voltage outputted from the solar cell 11, that is, the voltage VPL in the power line PL is reduced. More specifically, because relatively high current flows via the capacitor 16 immediately after timing T1, the voltage VPL is greatly reduced. In the example in FIG. 3, between timing T1 and timing Ta, the voltage VPL is reduced from a level higher than the first reference voltage VREFH to a level lower than the second reference voltage VREFL, and between timing Ta and timing T2, the voltage VPL is increased from a level lower than second reference voltage VREFL to a level higher inside the dead zone. The increase in the voltage VPL between timing Ta and timing T2 is caused by the rise in voltage between the terminals of the capacitor 16. Timing Ta is a timing after timing T1 and before timing T2.

When the voltage VPL is in the dead zone at timing T2, the control unit 18 switches the main switch circuit 13 from OFF to ON by outputting a first ON control signal to the main switch circuit 13. As long as the charge ON control signal continues to be outputted from the host controller 20 (or as long as a charge OFF control signal is not outputted from the host controller 20), the first ON control signal continues to be outputted by the control unit 18 after timing T2. In the example in FIG. 3, the first ON control signal continues to be outputted and the main switch circuit 13 remains ON after timing T2.

Because voltage VPL is in the dead zone at timing T2, the voltage VBAT of the battery module 12 does not rise above the first reference voltage VREFH immediately after the main switch circuit 13 is switched from OFF to ON, and the voltage VPL matches voltage VBAT prior to timing T2. In FIG. 3, voltage VBAT appears to temporarily rise somewhat immediately after timing T2, but this increase does not actually occur.

At timing T3, which occurs once a predetermined time has elapsed since the main switch circuit 13 was switched from OFF to ON at timing T2, the control unit 18 switches the sub-switch circuit 14 from ON to OFF by outputting a second OFF control signal to the sub-switch circuit 14. After the main switch circuit 13 has been turned ON, the flow of current to the parallel circuit 15 becomes unnecessary and wasteful. This is because the sub-switch circuit 14 is turned OFF after the main switch circuit 13 has been turned ON. The sub-switch circuit 14 remains OFF until the start of charging is started after timing T3. (For example, it remains OFF until a charge ON command signal is outputted from the host controller 20 after output of the charge OFF command signals.) During this period, the stored charge in the capacitor 16 is discharged via the resistor 17.

As mentioned above, the control unit 18 temporarily turns ON the sub-switch circuit 14 and draws current from the solar cell 11 into the parallel circuit 15 (that is, allows current from the solar cell 11 to flow into the parallel circuit 15) prior to switching the main switch circuit 13 from OFF to ON. This suppresses the voltage VPL to less than the first reference voltage VREFH. (In other words, the voltage VPL, which is higher than the first reference voltage VREFH prior to timing T1 is reduced to less than the first reference voltage VREFH after timing T1.) During this suppression, the control unit 18 switches the main switch circuit 13 from OFF to ON and then switches the sub-switch circuit 14 from ON to OFF. This configuration and signal control can be used to eliminate a rise in the voltage VBAT above the first reference voltage VREFH immediately after the timing at which the main switch circuit 13 is switched from OFF to ON, eliminate the output of the force OFF signal, and realize the desired charge. In other words, unnecessary protection operations (forcibly turning OFF the main switch circuit 13) based on transitional voltage fluctuations can be suppressed. As a result, direct current output from the power supply can be supplied to the battery module 12 as intended.

The control unit 18 can set the timing T2 for outputting the first ON control signal to the main switch circuit 13 based on the results of detecting voltage VPL. In other words, a voltage detector (not shown) can be installed in the storage system 1 (for example, inside the control unit 18) to detect the voltage VPL of the power line PL, and the control unit 18 compares the detected voltage VPL to a predetermined voltage VTG in the dead zone (therefore, VREFL<VTG<VREFH). Then, as the detected voltage rises VPL, the control unit 18 treats the timing at which the detected voltage VPL matches voltage VTG as timing T2, and can output the first ON control signal (that is, switch the main switch circuit 13 from OFF to ON) on this timing.

The control unit 18 may set the voltage VTG based on the voltage VBAT immediately prior to timing T1, at timing T1 itself, or immediately prior to T2. The voltage VTG may also be at a level lower than the second reference voltage VREFL. When the voltage VTG is at a level lower than the second reference voltage VREFL, the main switch circuit 13 is switched from OFF to ON when the voltage VTG is at a level lower than the second reference voltage VREFL. Also, when the detected voltage VPL is falling, the control unit 18 can treat the timing at which the detected voltage VPL matches the voltage VTG as timing T2, and output the first ON control signal. In this way, voltage VBAT rising above the first reference voltage VREFH can be avoided immediately after the main switch circuit 13 is switched from OFF to ON.

After the sub-switch circuit 14 is switched from OFF to ON at timing T1, the control unit 18 may treat the timing after a predetermined time has elapsed as timing T2, and output a first ON control signal on this timing (that is, switch the main switch circuit 13 from OFF to ON). After the sub-switch circuit 14 is switched from OFF to ON at timing T1, the timing at which the predetermined reference time has elapsed can be determined through experimentation as the timing at which the voltage VPL is within the dead zone or is below the second reference voltage VREFL.

In the present embodiment, the circuit incorporating the sub-switch circuit 14 and the parallel circuit 15 works with the control unit 18 to suppress the voltage VPL applied to the power line PL to less than the first reference voltage VREFH. In this example, the parallel circuit 15 is a current drawing circuit which draws current from the solar cell 11 when the sub-switch circuit 14 is turned ON. However, the control unit 18 may include configurational elements of the suppression circuit. Any circuit which draws current from the solar cell 11 when the sub-switch circuit 14 is turned ON and is able to suppress the applied voltage VPL to less than the first reference voltage VREFH can be used as the current drawing circuit.

Figure 4:
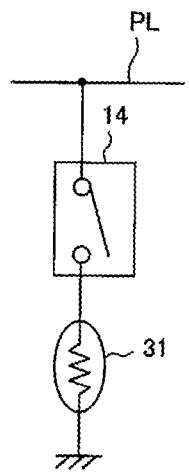
FIG. 4 is a modified configuration diagram of a portion of the storage system in the embodiment of the present invention.
Figure 5:
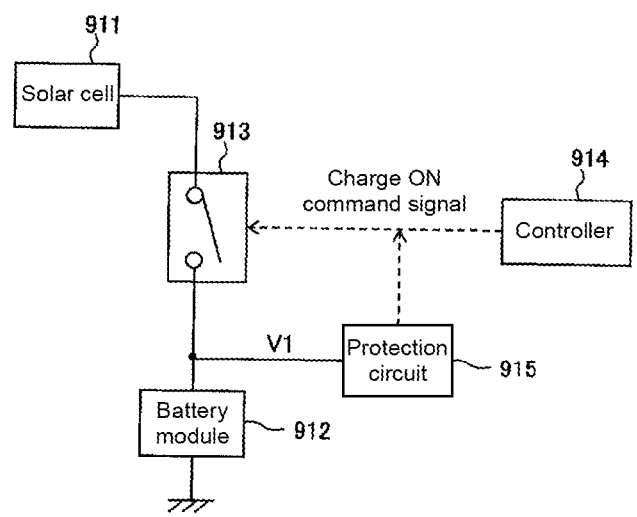
FIG. 5 is a configuration diagram of a charging system of the prior art.
Figure 6:
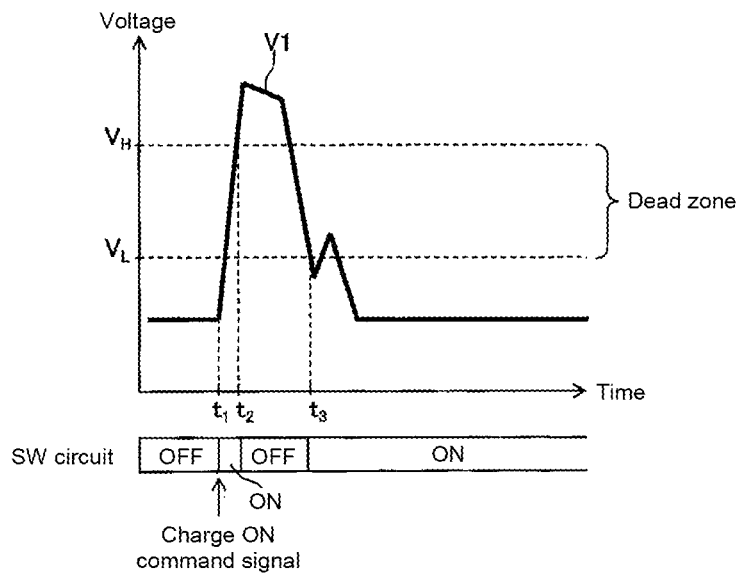
FIG. 6 is a graph showing the first charging operation performed by the prior art.
Figure 7:
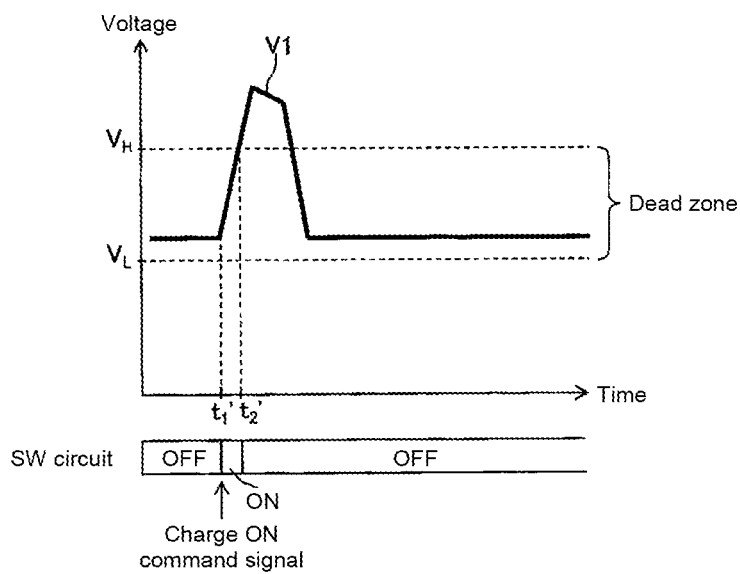
FIG. 7 is a graph showing the second charging operation performed by the prior art.
Figure 8:
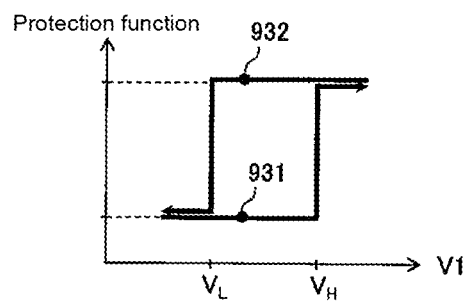
FIG. 8 is a state transition diagram used to explain the second charging operation performed by the prior art.

For example, as shown in FIG. 4, a resistor element having positive temperature characteristics (that is, a resistor element having a positive temperature coefficient) can be used instead of the parallel circuit 15. One end of the resistor element 31 is connected to the second conduction terminal of the sub-switch circuit 14, and the other end of the resistor element 31 is connected to the reference potential point. As a result, when the switch element 14 is turned ON, the voltage VPL in the power line PL is applied to the resistor element 31.

The resistor element 31 may be a resistor element classified as a PTC (positive temperature coefficient) thermistor. A PTC thermistor is a thermistor having positive temperature characteristics (that is, a thermistor having a positive temperature coefficient). As is commonly known, the resistance value of a thermistor changes more significantly in response to a temperature change than an ordinary resistor element used to obtain a fixed resistance value (such as a carbon film resistor). In a PTC thermistor, the resistance value of the thermistor itself rises as the temperature of the thermistor itself rises. As a result, when a PTC thermistor is used as the resistor element 31 serving as the current drawing circuit, the waveforms 311, 312 described above with reference to FIG. 3 are obtained. Immediately after timing T1, the resistance value of the resistor element 31 is relatively low, but the resistance value of the resistor element 31 increases after T1 as the element itself begins to generate heat. In this way, the voltage applied to the power line PL can be suppressed to less than an upper level voltage using a simple configuration.

In addition, the current drawing circuit may be formed using a transistor or a Zener diode.

The sub-switch circuit 14 and the parallel circuit 15 may be omitted from the storage system 1, and the detected value of the voltage VBAT may be supplied to the protection circuit 19 via a low-pass filter. When the time constant of the low-pass filter is set properly, the protection circuit 19 does not output a force OFF signal at timing T1, even when the main switch circuit 13 has been switched from OFF to ON. However, when the low-pass filter is provided upstream from the protection circuit 19, and high voltage is applied to the positive terminal 12A via the main switch circuit 13 to truly protect the battery module 12, the timing at which the main switch circuit 13 is turned OFF is delayed. Therefore, the configuration with a sub-switch circuit 14 described above is preferred.

Variations

Several variations of the embodiments of the present invention are possible without departing from the technical scope of the claims. The embodiments described above are examples of embodiments of the present invention, and the meanings of the terms for each configurational requirement of the present invention are not restricted to the descriptions in the embodiments above. Specific numerical values in the text of the descriptions are merely for illustrative purposes, and these can be changed to any other numerical value. Annotations applicable to the embodiments described above are included below in Note 1 through Note 3. The contents of these notes can be combined in any way that is not contradictory.

[Note 1]

In the embodiment described above, the power supply for outputting direct current voltage to the power line PL was a solar cell 11. However, the power supply outputting direct current voltage to the power line PL can be a power supply other than a solar cell 11 (such as a power supply which generated electricity using wind power or a fuel cell). Similarly, the power receiving unit that receives power from the power supply via the power line PL and the main switch circuit 13 may be a power receiving unit other than a battery module 12.

[Note 2]

The storage system 1 in FIG. 1 can incorporate the switching device. The switching device may also include some of the configurational elements of the storage system 1. For example, it may include the power line PL, the main switch circuit 13, the sub-switch circuit 14, the parallel circuit 15 (or resistor 31), the control unit 18, and the protection circuit 19. It may also include the host controller 20. The storage system may also be interpreted to be a charge system or a power system.

[Note 3]

The storage system 1 or switching device can be mounted in a mobile object operated using power discharged from the battery power module 12 (an electric vehicle, boat, aircraft, elevator, walking robot, etc.) or in an electronic device (personal computer, mobile phone, etc.), or can be incorporated into a power system for a household or production facility.

KEY TO THE DRAWINGS

1: Storage system
11: Solar cell
12: Battery module
13: Main switch circuit
14: Sub-switch circuit
15: Parallel circuit
18: Control unit
19: Protection circuit

What is claimed is:

1. A switching device comprising:
an electric power line for receiving direct current voltage outputted from an electric power supply;
a main switch circuit interposed in series between the electric power line and a power receiving unit;
a control unit for turning ON or OFF the main switch circuit;
a protection unit for forcibly turning OFF the main switch circuit when the voltage inputted to the power receiving unit exceeds a predetermined upper limit voltage; and
a suppressor circuit connected to the electric power line;
wherein the control unit is structured to suppress the voltage inputted to the electric power line to less than the upper limit voltage using the suppressor circuit prior to switching the main switch circuit from OFF to ON; and wherein the suppressor circuit comprises a sub-switch circuit turned ON and OFF by the control unit and connected to the electric power line, and a current drawing circuit structured to draw in current from the electric power supply when the sub-switch circuit is turned ON.

2. The switching device according to claim 1, wherein the control unit suppresses the voltage inputted to the electric power line to less than the upper limit voltage using the suppressor circuit prior to switching the main switch circuit from OFF to ON by temporarily turning ON the sub-switch circuit and drawing in current from the electric power supply to the current drawing circuit.

3. The switching device according to claim 2, wherein the control unit switches the main switch circuit from OFF to ON when the voltage applied to the electric power line has been suppressed to less than the upper limit voltage, and then switches the sub-switch circuit from ON to OFF.

4. The switching device according to claim 2, wherein the control unit detects the voltage inputted to the electric power line, switches the main switch circuit from OFF to ON when the detected voltage has been suppressed to less than the upper limit voltage, and then switches the sub switch circuit from ON to OFF.

5. The switching device according to claim 2, wherein the control unit switches the main switch circuit from OFF to ON and then switches the sub switch circuit from ON to OFF after a predetermined period of time has elapsed since switching the sub-switch circuit from OFF to ON prior to switching the main switch circuit from OFF to ON.

6. The switching device according to claim 2, wherein the current drawing circuit includes a parallel circuit with a capacitor element and a resistor element, and voltage in the electric power line is applied to the parallel circuit when the sub-switch circuit is turned ON.

7. The switching device according to claim 2, wherein the current drawing circuit includes a resistor element having positive temperature characteristics, and the voltage in the electric power line is applied to the resistor element when the sub-switch circuit is turned ON.

8. The switching device according to claim 2, wherein the voltage in the electric power line is higher than the upper limit voltage when the main switch circuit and the sub-switch circuit are turned OFF.

* * * * *